US011287003B2

(12) United States Patent
Dhurandhar et al.

(10) Patent No.: US 11,287,003 B2
(45) Date of Patent: Mar. 29, 2022

(54) INTEGRAL UNIT FOR SERVICE BRAKE AND FAIL-SAFE PARK BRAKE

(71) Applicant: J.C. BAMFORD EXCAVATORS LIMITED, Uttoxeter (GB)

(72) Inventors: Swapnil P. Dhurandhar, Maharashtra (IN); Pratish Prabhakar Malushte, Maharashtra (IN); Sanjeev Arora, Haryana (IN)

(73) Assignee: J.C. BAMFORD EXCAVATORS LIMITED, Uttoxeter (GB)

( * ) Notice: Subject to any disclaimer, the term of this patent is extended or adjusted under 35 U.S.C. 154(b) by 0 days.

(21) Appl. No.: 16/457,717

(22) Filed: Jun. 28, 2019

(65) Prior Publication Data

US 2020/0003267 A1 Jan. 2, 2020

(30) Foreign Application Priority Data

Jun. 28, 2018 (GB) ..................................... 1810575

(51) Int. Cl.
*F16D 55/24* (2006.01)
*F16D 65/18* (2006.01)
(Continued)

(52) U.S. Cl.
CPC .............. *F16D 65/18* (2013.01); *B60T 1/065* (2013.01); *F16D 55/40* (2013.01); *F16D 2121/06* (2013.01); *F16D 2125/08* (2013.01)

(58) Field of Classification Search
CPC .......... F16D 55/24; F16D 55/36; F16D 55/38; F16D 55/39; F16D 55/40; F16D 55/41;
(Continued)

(56) References Cited

U.S. PATENT DOCUMENTS

| 3,650,364 A | 3/1972 | Laing |
| 3,836,201 A * | 9/1974 | Stimson .................. B60T 1/065 |
| | | 301/6.2 |

(Continued)

FOREIGN PATENT DOCUMENTS

| CN | 101788028 A | 7/2010 | |
| DE | 10201366 A1 * | 7/2003 | ............. F16D 55/36 |

(Continued)

OTHER PUBLICATIONS

Search Report for GB1810575.9, dated Dec. 12, 2019.

(Continued)

*Primary Examiner* — Robert A. Siconolfi
*Assistant Examiner* — Stephen M Bowes
(74) *Attorney, Agent, or Firm* — Marshall, Gerstein & Borun LLP (57) ABSTRACT

An actuation mechanism for a multi-plate disc brake includes an energy storage element configured to apply said disc brake, the energy storage element being movable between a first position where said disc brake is released, and a second position where said disc brake is applied; a force transmission path configured to transmit force from the energy storage element to apply said disc brake; and a hydraulic chamber. The force transmission path includes a first member and a second member arranged in series; wherein the hydraulic chamber is configured, when pressurized, to act on the first member such that the energy storage element is moved to the first position; and wherein the second member is separated from the chamber such that, when the chamber is pressurized, no pressure is applied to the second member.

14 Claims, 5 Drawing Sheets

(51) Int. Cl.
*B60T 1/06* (2006.01)
*F16D 55/40* (2006.01)
*F16D 121/06* (2012.01)
*F16D 125/08* (2012.01)

(58) Field of Classification Search
CPC ............. F16D 2125/06; F16D 2121/06; F16D 65/186; F16D 2055/0058; B60T 1/065
See application file for complete search history.

(56) References Cited

U.S. PATENT DOCUMENTS

| | | | | |
|---|---|---|---|---|
| 3,863,038 | A * | 1/1975 | Kreitner | F16D 55/40 188/170 |
| 4,147,241 | A * | 4/1979 | Preniczny | B64C 25/44 188/264 G |
| 4,358,000 | A * | 11/1982 | Cumming | B60T 1/065 188/170 |
| 5,601,160 | A | 2/1997 | Horsch | |
| 6,152,269 | A | 11/2000 | Malvestio | |
| 6,506,138 | B2 | 1/2003 | Panizzolo | |
| 2007/0045059 | A1* | 3/2007 | Dennis | F16D 65/186 188/71.5 |
| 2011/0253488 | A1 | 10/2011 | Vidal et al. | |
| 2012/0221184 | A1 | 8/2012 | Pfohl et al. | |
| 2018/0087486 | A1* | 3/2018 | Engrand | F03C 1/0472 |

FOREIGN PATENT DOCUMENTS

| | | | |
|---|---|---|---|
| DE | 10 2006 001895 A1 | 7/2007 | |
| DE | 10 2007 053325 A1 | 5/2009 | |
| EP | 1 070 847 A2 | 1/2001 | |
| EP | 1 122 455 A2 | 8/2001 | |
| EP | 2 626 587 A1 | 8/2013 | |
| EP | 3 299 656 A1 | 3/2018 | |
| FR | 2 796 886 A1 | 2/2001 | |
| GB | 2087014 A | 5/1982 | |
| IT | 208288 A * | 1/1987 | ............ B60K 17/046 |
| WO | WO-2009/059720 A1 | 5/2009 | |
| ZA | 314479 A * | 5/1989 | ............. F16D 55/38 |

OTHER PUBLICATIONS

Extended European Search Report issued in European Patent Application No. 19 18 3030, dated Nov. 20, 2019.
Examination Report for GB 1810575.9, dated Mar. 25, 2021.

* cited by examiner

INTEGRAL UNIT FOR SERVICE BRAKE AND FAIL-SAFE PARK BRAKE

FIELD OF THE INVENTION

The present teachings relate to an actuation mechanism for a multi-plate disc brake. The present teachings further relate to a multi-plate disc brake, and to a working machine with a multi-plate disc brake.

BACKGROUND OF THE INVENTION

It is known to use a spring applied, hydraulic released (SAHR) type oil-cooled multi-plate brake as a parking brake. Advantageously, the default position of such a brake is in the applied position, providing improved safety. Known oil-cooled multi-plate brakes have a series of friction plates connected to a carrier or driveshaft, interleaved with a series of reaction plates connected to a fixed member such as axle housing. To apply such a brake as a service brake, hydraulic pressure is applied via a piston to force the friction plates and reaction plates together, so that braking torque applied to the friction plates reduces vehicle speed. When a vehicle is parked, the parking brake is applied by means of a spring applying the piston to force the friction plates and reaction plates together and so prevent movement of the friction plates, thus preventing movement of the vehicle.

A series of components in force transmission path transmits force from the spring the friction plates and reaction plates. In known prior art, for example U.S. Pat. Nos. 6,152,269 and 6,506,138, the actuation path includes a first piston adjacent the spring. A pin extends between the first piston and a second piston arranged to act on the friction plates and reaction plates. Force exerted by the spring is transmitted to the second piston via the first piston and the pin.

In order to release the brake, hydraulic pressure is applied to the first piston, moving the first piston towards the spring such that force from the spring is no longer applied to the pin, so releasing the brake. Hydraulic pressure is provided by filling a chamber in contact with the first piston with a pressurized fluid. However, the chamber is connected to the pin. In U.S. Pat. No. 6,506,138, when the chamber is filled with pressurized fluid, some pressure is applied to the pin as well as to the first piston, so that the pin is moved towards the second piston. The second piston thus applies some unwanted actuation force to the friction plates and reaction plates, creating drag torque and so reducing efficiency of a working machine when in motion.

This is addressed in U.S. Pat. No. 6,152,269 by locking an inboard end of the pin in the first piston, and location of an outboard end of the pin in the housing. However, the points at which the pin is constrained in the first piston and the housing are not always co-linear. The pin motion can therefore be skewed, resulting in wear of e.g. an O ring seal between the pin and the housing, and so resulting in leakage. Manufacture of a pin for such an arrangement is critical, increasing cost.

The present teachings seek to avoid or at least mitigate the problems of the prior art.

SUMMARY

There is provided an actuation mechanism for a multi-plate disc brake, the actuation mechanism comprising an energy storage element configured to apply said disc brake, the energy storage element being movable between a first position where said disc brake is released, and a second position where said disc brake is applied; a force transmission path configured to transmit force from the energy storage element to apply said disc brake; and a hydraulic chamber. The force transmission path comprises a first member and a second member arranged in series; wherein the hydraulic chamber is configured, when pressurized, to act on the first member such that the energy storage element is moved to the first position; and wherein the second member is separated from the chamber such that, when the chamber is pressurized, no pressure is applied to the second member.

As no pressure is applied to the second member when the brake is released, no drag torque is generated in the disc brake by the second member.

The first member may be configured to separate the second member from the chamber.

The first member may comprise a first piston and a projection secured to the first piston, wherein the projection is configured to transmit force to the second member.

The projection may be configured to separate the second member from the chamber.

Advantageously, this arrangement uses existing components to separate the second member from the chamber and so avoid drag torque, allowing for a compact arrangement. The number of components required is kept to a minimum, as is cost.

The projection may comprise an O-ring seal configured to seal the chamber so as to separate the second member from the chamber.

An O-ring seal at the projection provides a simple and effective means of sealing the second member off from the chamber.

The projection may be adjustable in a radial direction in relation to the first piston.

The first piston may define a bore, wherein the projection may be secured to the first piston by a fastener extending through the bore, and wherein the diameter of the bore may be greater than the diameter of a portion of the fastener extending through the bore, such that radial clearance is provided between the fastener and the first piston.

Advantageously, radial adjustability of the projection in relation to the first piston allows for inaccuracies or tolerances in manufacturing to be adjusted for upon assembly.

The force transmission path may comprise a series of second members circumferentially spaced from one another.

The first member may comprise a first piston and a series of projections secured to the first piston, wherein each projection is configured to transmit force to one of said second members.

The first member may comprise a first piston and a series of three or more projections secured to the first piston.

The projections may be evenly circumferentially spaced about the first piston.

Such an arrangement allows force transmission to be balanced, so that force is transmitted evenly to apply the disc brake.

Each projection may comprise an O-ring seal configured to seal the chamber so as to separate the respective second member from the chamber.

As above, an O-ring seal at each projection provides a simple and effective means of sealing each second member off from the chamber.

The chamber may be annular.

The energy storage element may be a disc spring or Belleville washer, or a diaphragm spring, or a series of coil springs.

A disc spring is a simple and effective type of energy storage element, suited to this application.

The force transmission path may comprise a second piston between the second member and the disc brake.

The second piston allows force to be evenly transmitted to the disc brake.

There is also provided a multi-plate disc brake comprising an actuation mechanism as set out above.

There is further provided a working machine comprising a multi-plate disc brake, wherein the multi-plate disc brake comprises an actuation mechanism as set out above.

There is yet further provided an actuation mechanism for a multi-plate disc brake, the actuation mechanism comprising an energy storage element configured to apply said disc brake, the energy storage element being movable between a first position where said disc brake is released, and a second position where said disc brake is applied; a force transmission path configured to transmit force from the energy storage element to apply said disc brake; and a hydraulic chamber. The force transmission path comprises a first member and a second member arranged in series; wherein the hydraulic chamber is configured, when pressurized, to act on the first member such that the energy storage element is moved to the first position. The first member comprises a first piston and a projection secured to the first piston, wherein the projection is configured to transmit force to the second member. The projection is adjustable in a radial direction in relation to the first piston.

The first piston may define a bore, wherein the projection may be secured to the first piston by a fastener extending through the bore, and wherein the diameter of the bore may be greater than the diameter of a portion of the fastener extending through the bore, such that radial clearance is provided between the fastener and the first piston.

BRIEF DESCRIPTION OF THE DRAWINGS

Reference will now be made, by way of example only, to the accompanying drawings, in which.

DETAILED DESCRIPTION OF THE EMBODIMENTS

Figure 1:
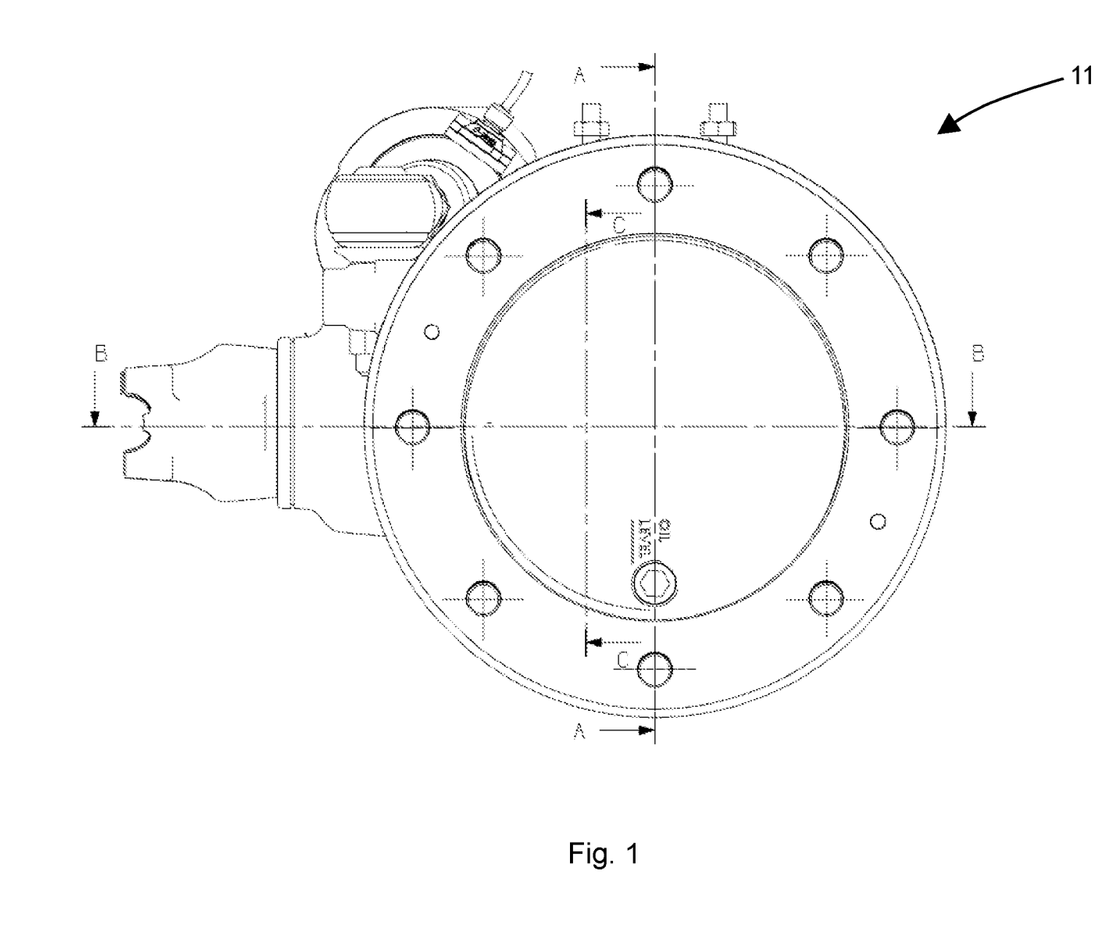
FIG. 1 is an end view of an axle casing housing a multi-plate disc brake.
Figure 2:
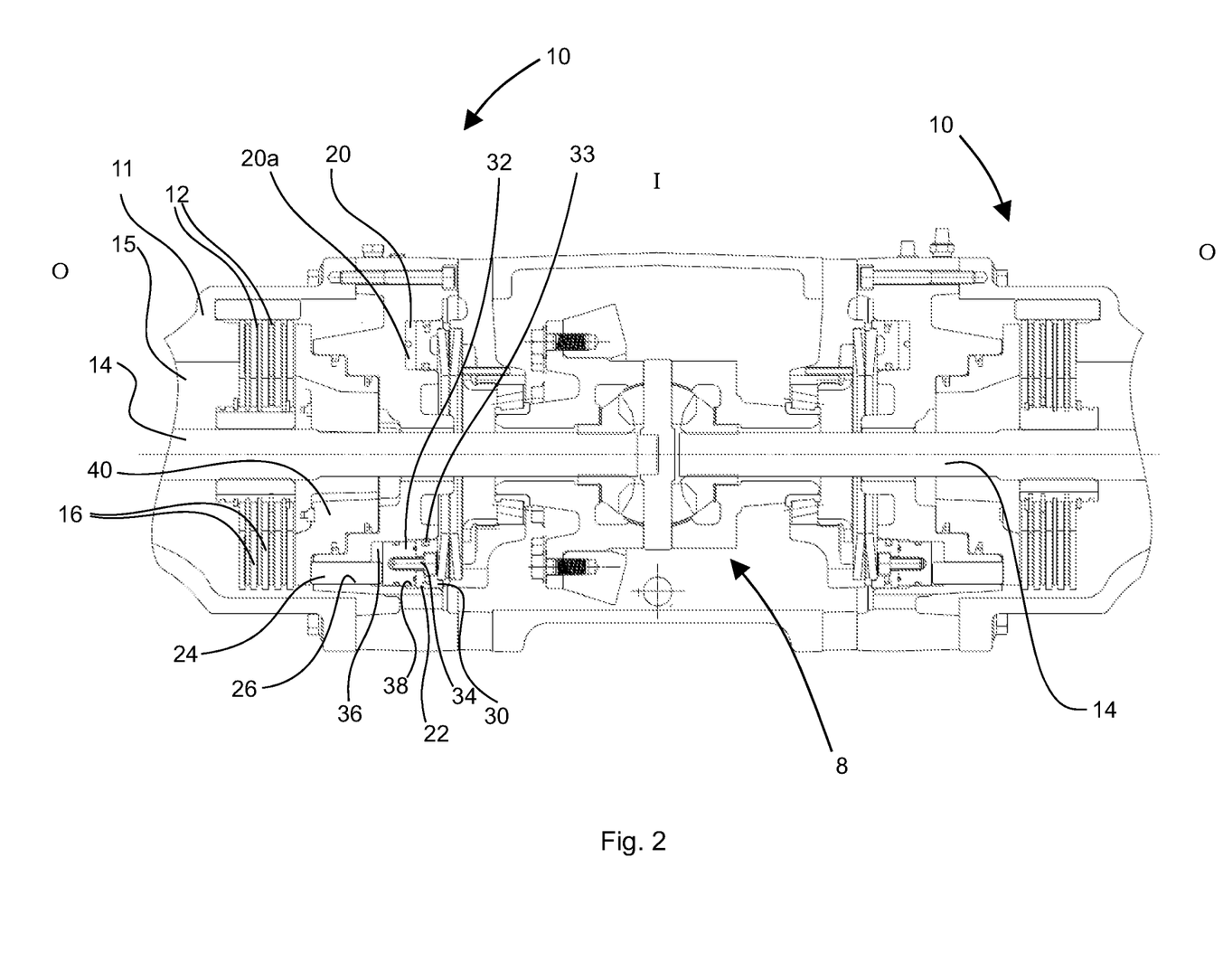
FIG. 2 is a cross-sectional view through the disc brake of FIG. 1 along the line A-A, showing an actuation mechanism for a multi-plate disc brake according to an embodiment, where an energy storage element is in a first position.
Figures 3, 3A:
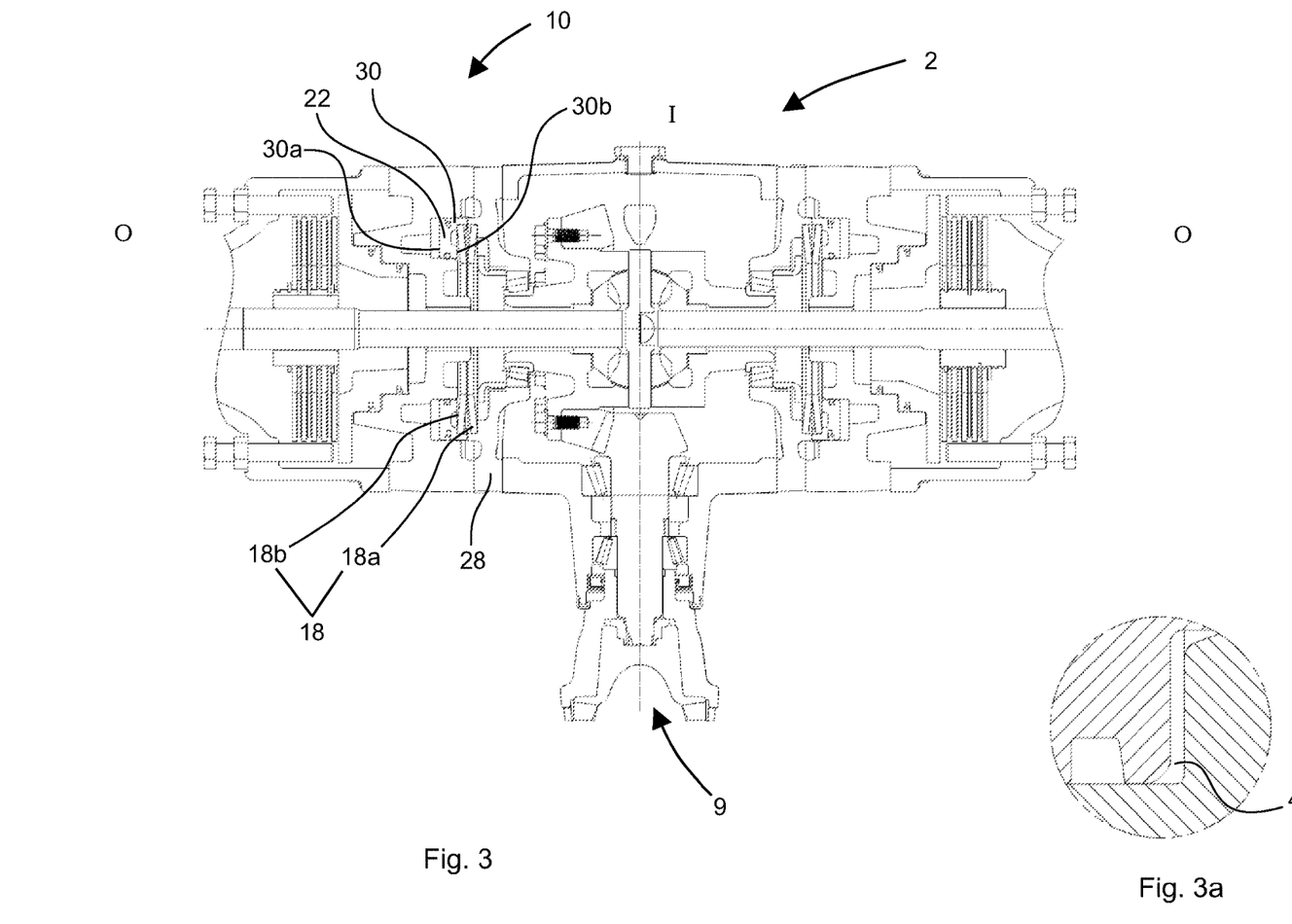
FIG. 3 is a cross-sectional view through the disc brake of FIG. 1 along the line B-B, showing the actuation mechanism of FIG. 2.
FIG. 3A is detail A of FIG. 3.

FIG. 1 shows an axle casing 11 of a steered drive axle 2, within which is housed an oil-cooled disc brake. FIGS. 2 and 3 show a pair of like disc brakes 10 in cross-section, each disc brake 10 located on a halfshaft 14. As shown in FIGS. 2 and 3, the disc brakes 10 have outboard O and inboard I sides. The inboard I ends of the halfshafts 14 extend to a differential 8. A prop shaft input 9 connected to the differential 8 provides a coupling for a prop shaft (not shown).

For clarity, a single disc brake 10 is discussed in further detail. The disc brake 10 is a multi-plate disc brake, having a series of friction plates 12 fixed to the halfshaft 14 by a carrier 15. The friction plates 12 are interleaved with a series of reaction plates 16. The reaction plates 16 are fixed to the axle casing 11. In order to apply the disc brake 10 the friction plates 12 and the reaction plates 16 are forced together by an actuation mechanism, so that braking torque applied to the friction plates 12 by the reaction plates 16 reduces vehicle speed or inhibits vehicle movement.

The disc brake 10 can be applied as a service brake, or as a parking brake. The present disc brake teachings are concerned with the application of the disc brake 10 as a parking brake. When used as a parking brake, the disc brake 10 is of the spring applied, hydraulic released (SAHR) type described above.

The disc brake 10 has an actuation mechanism including an energy storage element 18 configured to apply the brake 10. The energy storage element 18 is located inboard of the friction and reaction plates 12, 16. In this embodiment, the energy storage element is a pair of disc springs 18a, 18b (such as Belleville washers). The springs are arranged opposed to one another in series, with an inboard spring 18a and an outboard spring 18b, so that the springs 18a, 18b extend away from one another. The outer edge of the inboard spring 18a abuts a housing portion 28. The housing portion 28 axially locates the spring 18a, and provides a reaction surface, so that the springs 18a, 18b are configured to exert force in the outboard direction.

In alternative embodiments, some other suitable type of energy storage element is used, such as diaphragm springs. In one embodiment, a single spring is used. In other embodiments, diaphragm springs or disc springs are arranged in parallel, as well as or instead of in series. In one embodiment, multiple coil springs are arranged circumferentially around the first piston.

Figure 4:
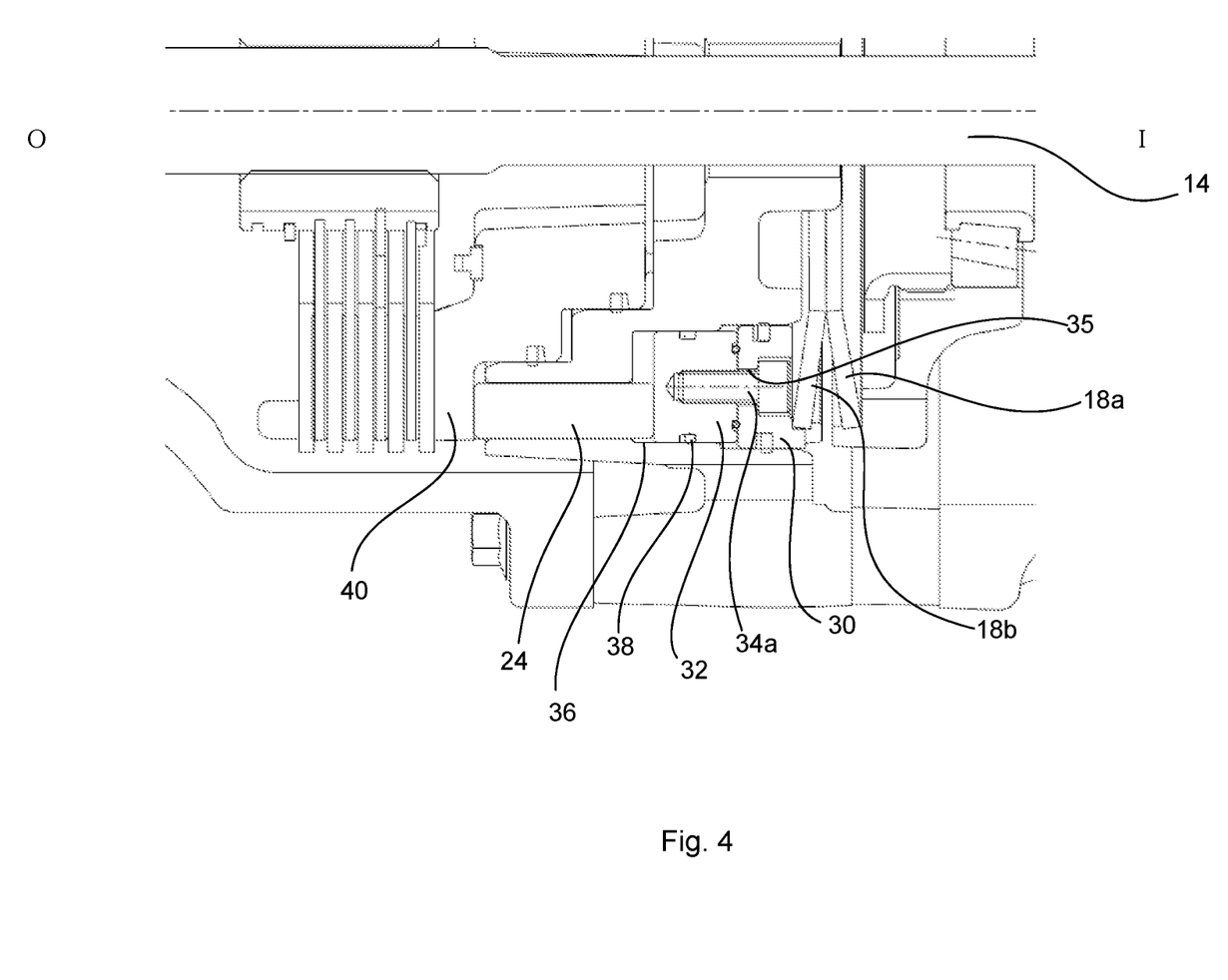
FIG. 4 is a detail cross-sectional view through the disc brake of FIGS. 1, 2 and 3 along the line B-B, where the energy storage element is in a second position.

The disc springs 18a, 18b are movable between a first position, as shown in FIGS. 2 and 3, where the disc brake 10 is released, and a second position, as shown in FIG. 4, where the disc brake 10 is engaged.

As shown in FIGS. 2 and 3, the actuation mechanism includes a force transmission path between the springs 18a, 18b and the reaction plates 16, so as to use force exerted by the springs 18a, 18b to apply the brake 10. A hydraulic chamber 20 is configured to release the brake 10.

The force transmission path includes, in this embodiment, a first member 22 and a second member 24, arranged in series. The first member 22 is inboard of the second member 24, being between the springs 18a, 18b and the second member 24. When the springs 18a, 18b are in the second position, force is transmitted from the springs 18a, 18b to the first member 22. Force is transmitted from the first member 22 to the second member 24, and thence to the reaction plates 16 to apply the disc brake 10.

The first member 22 and the hydraulic chamber 20 are arranged such that when the hydraulic chamber 20 is pressurized with brake fluid, the first member 22 is moved inboard, towards the springs 18a, 18b. The first member 22 compresses the springs 18a, 18b to the first position, as shown in FIGS. 2 and 3, so that the brake 10 is released.

The second member 24 is separated from the chamber 20. Pressurization of the chamber 20 does not therefore cause any movement in the second member 24 in the outboard direction. No drag torque is therefore generated by virtue of movement of the second member 24 when the brake 10 is released.

In this embodiment, the second member 24 is an elongate cylindrical member, supported in a cavity 26 outboard of the hydraulic chamber 20. The second member 24 is not fixed in a longitudinal direction but is free to move. In alternative embodiments, the second member is of some other suitable shape, such as oval in profile.

The first member 22 is, in this embodiment, configured to separate the second member 24 from the chamber 20. The first member 22 includes an annular first piston 30 and at least one projection 32. The chamber 20 is open to an outboard face 30a of the first piston 30, so that when the chamber 20 is pressurized, the piston 30 is moved in an inboard direction. An inboard face 30b of the piston 30 is in contact with the outboard spring 18b, so that when the piston 30 is moved inboard on pressurization of the chamber 20, the springs 18a, 18b are compressed, releasing the brake 10 as described above.

In this embodiment, the hydraulic chamber 20 is annular, so is in substantially even contact with the outboard face 30a of the first piston 30. In an alternative embodiment there are multiple hydraulic chambers, circumferentially spaced from one another.

The projection 32 extends from the first piston 30 in an outboard direction and is configured to transmit force to the second member 24. In this embodiment, the projection 32 is substantially cylindrical. In alternative embodiments, the projection is of some other suitable shape, such as oval in profile.

In this embodiment, the first member 22 has a series of three like projections 32 circumferentially spaced around the piston 30. A single projection 32 is shown in FIGS. 2 and 3, and is discussed in detail. In alternative embodiments, the first member has a single projection, or two projections, or four or more projections. Each projection 32 has a corresponding second member 24. In embodiments with alternative numbers of projections, there are a corresponding number of second members. In this embodiment each second member 24 is offset in relation to its respective projection 32. In an alternative embodiment each second member is co-axial with its respective projection. The offset between the longitudinal axes of the second member and the projection is used to transfer force to the desired point.

In this embodiment, the projection is in the form of a pin 32 fixed to the first piston 30. In this embodiment, the pin 32 is fixed to the first piston 30 by a fastener 34 that extends through a bore 35 defined by the first piston 30. In this embodiment the fastener is a threaded bolt 34. In alternative embodiments the fastener is a suitable alternative fastener.

The diameter of the bore 35 is greater than the diameter of a shank 34a of the bolt 34, so that clearance is provided in a radial direction between the shank 34a of the bolt 34 and the first piston 30. The radial clearance provided by the bore 35 allows the pin 32 to take the desired radial position with respect to the first piston 30, compensating for any errors in manufacturing. In other embodiments there may also be a circumferential clearance between the shank and the bore of the first piston to compensate for any tolerances in this direction.

An O-ring seal 33 located between the pin 32 and the first piston 30 seals the bolt 34 from the chamber 20. In alternative embodiments, the pin 32 is fixed to the first piston by some other suitable means, such as welding. In alternative embodiments, the first member comprises the first piston and an integral projection.

The chamber 20 has a cylindrical bore 36 extending in an outboard O direction from a main body 20a of the chamber 20 in which the pin 32 is accommodated. The bore 36 is adjacent to the cavity 26 that houses the second member 24. The pin 32 is configured to block the main body 20a of the chamber 20 from the second member 24. The pin 32 of this embodiment is encircled by an O-ring seal 38. The O-ring seal 38 forms a seal between the main body 20a of the chamber 20 from and the outboard end of the bore 36, thus preventing fluid in the main body 20a of the chamber 20 reaching the second member 24. Pressurization of the chamber 20 does not, therefore, affect the second member 24.

The seal 38 is located on the pin 32 such that, when the pin 32 is moved inboard by the maximum possible amount, the seal 38 remains within the bore 36, as shown in FIG. 4. The outboard end of the bore 36 and the second member 24 thus remain separated from the main body 20a of the chamber 20 even when the pin 32 is moved to its most inboard position.

In an alternative embodiment, the projection is encircled by two or more O ring seals. In alternative embodiments, some other suitable type of seal is provided, such as square, rectangular or oval seals.

In this embodiment, the force transmission path includes an annular second piston 40, outboard of the second member 24. The second member 24 applies force transmitted from the springs 18a, 18b to the second piston 40. Force is then transmitted by the second piston 40 to the friction and reaction plates 12, 16, to apply the brake 10. Applying force to the friction and reaction plates 12, 16 via the second piston 40 provides more even distribution of force.

In an alternative embodiment, the second member 24 is fixed to the second piston.

In this embodiment, the second piston 40 is also used to apply the brake 10 as a service brake. In order to apply the brake 10 as a service brake, a chamber 42 (as shown in the detail view of FIG. 3) is pressurized, to move the second piston 40 in the outboard O direction and so apply the brake 10. In an alternative embodiment, different means of application are used for the parking brake and the service brake.

Figure 5:
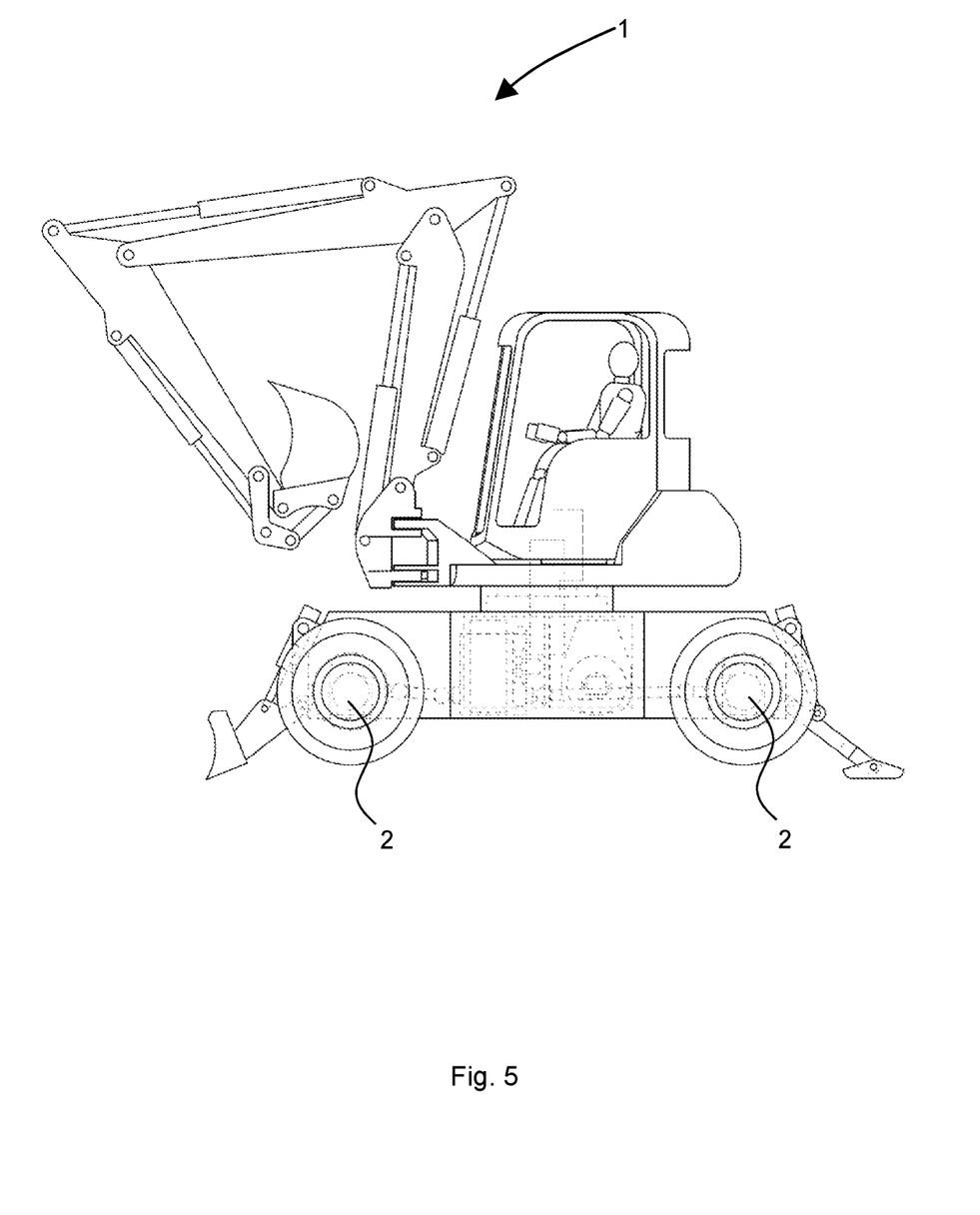
FIG. 5 is a view of a working machine having a drive axle incorporating the actuation mechanism of FIG. 1.

FIG. 5 shows a working machine 1 having a drive axle 2 incorporating the actuation mechanism of this embodiment. In operation, when a working machine operator disengages the machine's parking brake, the chamber 20 is pressurized with brake fluid, causing the parking brake 10 to be released as described above. When the working machine operator engages the parking brake, the fluid is released from the chamber 20, so that the disc springs 18a, 18b are no longer compressed, and the parking brake is applied. In the event of loss of pressurized fluid due to leakage in the braking system, the parking brake will automatically be applied.

The invention claimed is:

1. An actuation mechanism for a multi-plate disc brake, the actuation mechanism comprising:
  an energy storage element configured to apply said disc brake, the energy storage element being movable between a first position where said disc brake is released, and a second position where said disc brake is applied;
  a force transmission path configured to transmit force from the energy storage element to apply said disc brake; and
  a hydraulic chamber;
  wherein the force transmission path comprises a first member and a second member arranged in series;
  wherein the hydraulic chamber is configured, when pressurized, to act on the first member such that the energy storage element is moved to the first position;
  wherein the second member is separated from the hydraulic chamber such that, when the hydraulic chamber is pressurized, no pressure is applied to the second member by the hydraulic chamber;

wherein the first member comprises a first piston and a projection secured to the first piston, where the projection is configured to transmit force to the second member; and wherein the first piston defines a bore having a diameter, wherein the projection is secured to the first piston by a fastener extending through the bore, and wherein the diameter of the bore is greater than the diameter of a portion of the fastener extending through the bore, such that radial clearance is provided between the fastener and the first piston such that the projection is adjustable in a radial direction in relation to the first piston.

2. The actuation mechanism according to claim 1 wherein the first member is configured to separate the second member from the hydraulic chamber.

3. The actuation mechanism according to claim 1 wherein the projection is configured to separate the second member from the hydraulic chamber.

4. The actuation mechanism according to claim 3 wherein the projection comprises an O-ring seal configured to seal the hydraulic chamber so as to separate the second member from the hydraulic chamber.

5. The actuation mechanism according to claim 1 wherein the second member is one of a plurality of second members circumferentially spaced from one another.

6. The actuation mechanism according to claim 5 wherein the first member comprises a first piston and a series of three or more projections secured to the first piston.

7. The actuation mechanism according to claim 5 wherein the first member comprises a first piston and a series of projections secured to the first piston, wherein each projection is configured to transmit force to one of said second members.

8. The actuation mechanism according to claim 7 wherein the projections are evenly circumferentially spaced about the first piston.

9. The actuation mechanism according claim 7 wherein each projection comprises an O-ring seal configured to seal the hydraulic chamber so as to separate each of the respective second members from the hydraulic chamber.

10. The actuation mechanism according to claim 1 wherein the hydraulic chamber is annular.

11. The actuation mechanism according to claim 1 wherein the energy storage element is a selected one of a disc spring, a Belleville washer, a diaphragm spring, and a series of coil springs.

12. The actuation mechanism according to claim 1 wherein the force transmission path further comprises a second piston between the second member and the disc brake.

13. A multi-plate disc brake comprising an actuation mechanism, the actuation mechanism comprising:
    an energy storage element configured to apply said disc brake, the energy storage element being movable between a first position where said disc brake is released, and a second position where said disc brake is applied;
    a force transmission path configured to transmit force from the energy storage element to apply said disc brake; and
    a hydraulic chamber;
    wherein the force transmission path comprises a first member and a second member arranged in series;
    wherein the hydraulic chamber is configured, when pressurized, to act on the first member such that the energy storage element is moved to the first position;
    wherein the second member is separated from the hydraulic chamber such that, when the hydraulic chamber is pressurized, no pressure is applied to the second member by the hydraulic chamber;
    wherein the first member comprises a first piston and a projection secured to the first piston, where the projection is configured to transmit force to the second member; and
    wherein the first piston defines a bore having a diameter, wherein the projection is secured to the first piston by a fastener extending through the bore, and wherein the diameter of the bore is greater than the diameter of a portion of the fastener extending through the bore, such that radial clearance is provided between the fastener and the first piston such that the projection is adjustable in a radial direction in relation to the first piston.

14. A working machine comprising a multi-plate disc brake, wherein the multi-plate disc brake comprises an actuation mechanism, the actuation mechanism comprising:
    an energy storage element configured to apply said disc brake, the energy storage element being movable between a first position where said disc brake is released, and a second position where said disc brake is applied;
    a force transmission path configured to transmit force from the energy storage element to apply said disc brake; and
    a hydraulic chamber;
    wherein the force transmission path comprises a first member and a second member arranged in series;
    wherein the hydraulic chamber is configured, when pressurized, to act on the first member such that the energy storage element is moved to the first position;
    wherein the second member is separated from the hydraulic chamber such that, when the hydraulic chamber is pressurized, no pressure is applied to the second member by the hydraulic chamber; and
    wherein the first member comprises a first piston and a projection secured to the first piston, where the projection is configured to transmit force to the second member; and
    wherein the first piston defines a bore having a diameter, wherein the projection is secured to the first piston by a fastener extending through the bore, and wherein the diameter of the bore is greater than the diameter of a portion of the fastener extending through the bore, such that radial clearance is provided between the fastener and the first piston such that the projection is adjustable in a radial direction in relation to the first piston.

* * * * *